United States Patent
Stárek et al.

(10) Patent No.: US 12,456,186 B2
(45) Date of Patent: Oct. 28, 2025

(54) METHOD AND SYSTEM FOR PREPARING WEDGED LAMELLA

(71) Applicant: FEI Company, Hillsboro, OR (US)

(72) Inventors: Jaroslav Stárek, Brno (CZ); Tomáš Onderlika, Brno (CZ); Lukáš Hübner, Brno (CZ); Jakub Strejček, Brno (CZ)

(73) Assignee: FEI Company, Hillsboro, OR (US)

( * ) Notice: Subject to any disclaimer, the term of this patent is extended or adjusted under 35 U.S.C. 154(b) by 469 days.

(21) Appl. No.: 17/744,584

(22) Filed: May 13, 2022

(65) Prior Publication Data
US 2023/0364688 A1  Nov. 16, 2023

(51) Int. Cl.
| | |
|---|---|
| *G06T 7/00* | (2017.01) |
| *G01N 1/28* | (2006.01) |
| *G01N 23/2202* | (2018.01) |
| *G01N 23/2251* | (2018.01) |
| *H01J 37/20* | (2006.01) |
| *H01J 37/22* | (2006.01) |
| *H01J 37/28* | (2006.01) |

(52) U.S. Cl.
CPC ....... *G06T 7/0006* (2013.01); *G01N 23/2251* (2013.01); *H01J 37/20* (2013.01); *H01J 37/28* (2013.01); *G01N 1/286* (2013.01); *G01N 2001/2873* (2013.01); *G01N 23/2202* (2013.01); *G06T 2207/30108* (2013.01); *H01J 37/222* (2013.01)

(58) Field of Classification Search
None
See application file for complete search history.

(56) References Cited

U.S. PATENT DOCUMENTS

| | | | | |
|---|---|---|---|---|
| 8,222,599 | B1 * | 7/2012 | Chien | H01L 22/12 250/311 |
| 11,069,509 | B1 * | 7/2021 | Clarke | H01J 37/28 |
| 2007/0221842 | A1 * | 9/2007 | Morokuma | G01N 23/2251 250/307 |
| 2013/0186747 | A1 * | 7/2013 | Schmidt | G01N 1/286 204/192.33 |
| 2017/0097290 | A1 * | 4/2017 | Krause | H01J 37/02 |
| 2017/0117114 | A1 * | 4/2017 | Zeidler | H01J 37/28 |

FOREIGN PATENT DOCUMENTS

| | | | | | |
|---|---|---|---|---|---|
| CN | 103808552 B | * | 5/2018 | | B23K 26/03 |
| JP | 2006100788 A | * | 4/2006 | | G01N 1/32 |
| WO | WO-2014014446 A1 | * | 1/2014 | | H01J 37/22 |

OTHER PUBLICATIONS

English machine translation for JP-2006100788-A (Year: 2006).*
English machine translation for CN-103808552-B (Year: 2018).*

* cited by examiner

*Primary Examiner* — David E Smith
*Assistant Examiner* — Alina Kaliszewski

(57) ABSTRACT

Wedged lamella can be prepared by milling multiple sample slices from at least one side of a sample. The milling is monitored based on an SEM image acquired after removing one or more of the sample slices. The milling may be terminated responsive to an estimated distance between a first structure and a second structure along the height of the milled sample not greater than a threshold distance.

20 Claims, 8 Drawing Sheets

METHOD AND SYSTEM FOR PREPARING WEDGED LAMELLA

FIELD OF THE INVENTION

The present description relates generally to methods and systems for sample preparation, and more particularly, to preparing a wedged lamella.

SUMMARY

In one embodiment, a method for automatically preparing a wedged lamella, comprises removing multiple sample slices from at least one side of a sample with an ion beam, wherein after removing at least one sample slice of the multiple sample slices, acquiring an image of a sample surface with an electron beam, and estimating a distance between a first structure and a second structure along a height of the milled sample in the acquired image, and wherein the removal of the multiple sample slices is terminated responsive to the estimated distance not greater than a threshold distance.

In another embodiment, a charged particle microscopy system, comprises an ion column for directing an ion beam towards a sample, wherein the sample includes a first sample surface and a second sample surface on opposite sides of the sample; an electron column for directing an electron beam towards the sample; a detector for detecting electrons emitted from the sample; and a controller including computer readable instructions stored in a non-transitory memory and a processor, wherein when the instructions are executed by the processor, the system is configured to: mill the first sample surface of the sample with the ion beam to expose a third sample surface, wherein the third sample surface is not parallel to the second sample surface; acquire an image of a fourth sample surface with the electron beam; estimate a distance between a first structure and a second structure along a height of the milled sample in the acquired image; responsive to the estimated distance not greater than a threshold distance, stop milling the sample to obtain a wedged lamella, wherein the wedged lamella tapers along the height of the milled sample; and responsive to the estimated distance greater than the threshold distance, mill the third surface with the ion beam.

It should be understood that the summary above is provided to introduce in simplified form a selection of concepts that are further described in the detailed description. It is not meant to identify key or essential features of the claimed subject matter, the scope of which is defined uniquely by the claims that follow the detailed description.

BRIEF DESCRIPTION OF THE DRAWINGS

Like reference numerals refer to corresponding parts throughout the several views of the drawings.

DETAILED DESCRIPTION

Figure 1:
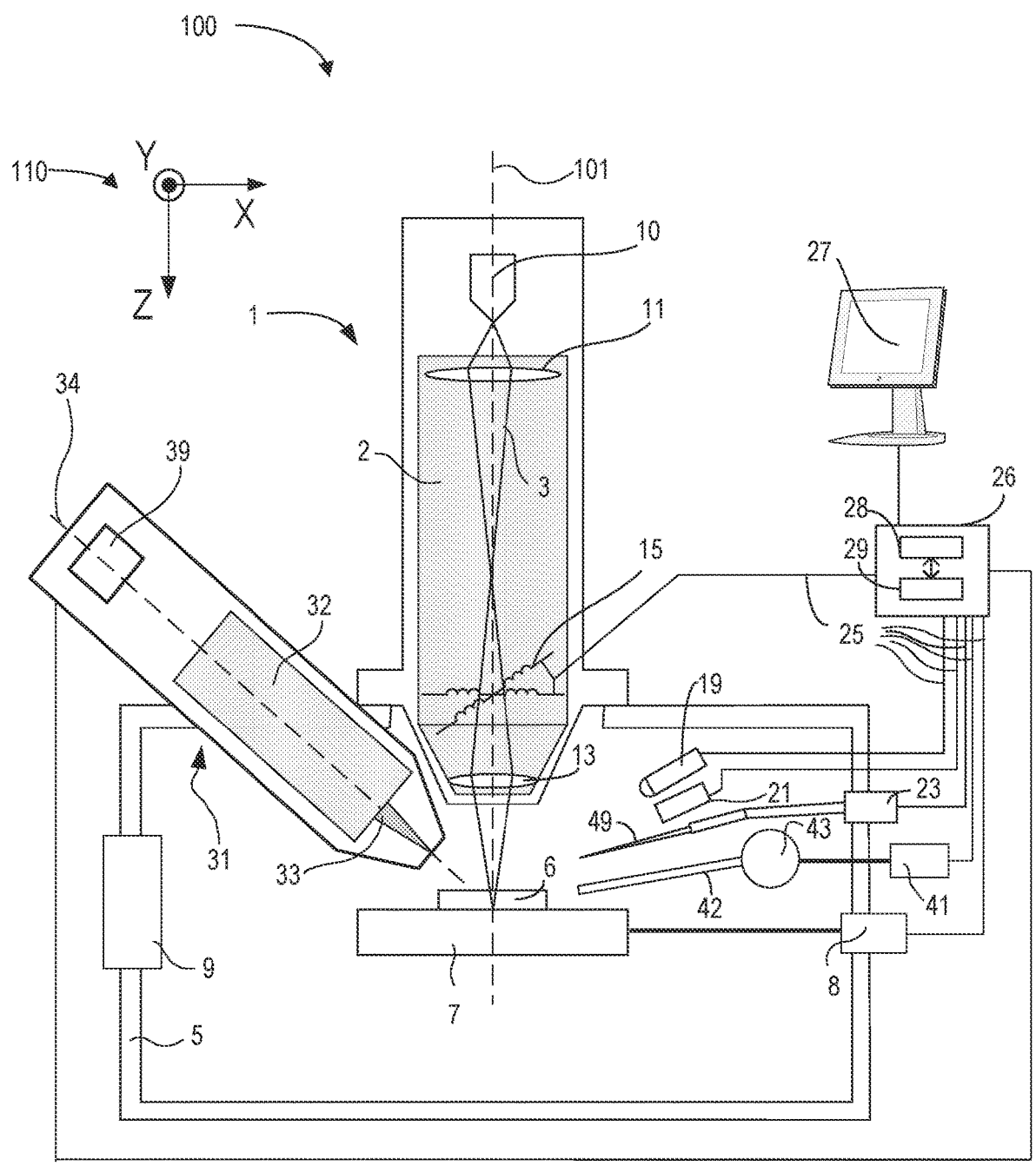
FIG. 1 shows an example charged particle microscopy system.

In order to acquire high resolution transmission electron microscopy (TEM) images, a lamella with a thickness of a few nanometers may be required. Preparing a lamella this thin can be challenging due to unpredictable sample twist and bend. One method to reduce the sample twist and bend is to prepare a wedge-shaped lamella, that is, a wedged lamella, wherein the lamella thickness is tapered/reduced towards the bottom edge of the lamella, along the height of the lamella. The wedged lamella may be prepared by milling a sample or a substrate using an ion beam. The milling needs to be precisely controlled so that the thickness of the wedged lamella at an area of interest reaches a desired thickness. In one example, the desired thickness may be 5 nm to 100 nm. In another example, the desired thickness is around 15 nm.

The following description relates to systems and methods for automatically preparing a wedged lamella. In some examples, the wedged lamella is prepared in a dual-beam charged particle microscopy system, such as the system shown in FIG. 1. A wedged lamella with a desired thickness at the area of interest may be prepared using the method disclosed in FIG. 2. In particular, the wedged lamella may be milled by removing sample slices from at least one side of two opposing sides of the sample using an ion beam. The milling is monitored or controlled by the distance of a first structure and a second structure along the height of the milled sample. The milling may be stopped when the distance between the structures reaches a threshold distance. The threshold distance may correspond to a desired lamella thickness at an area of interest. In this way, the wedged lamella may be automatically prepared. The wedged lamella is tapered along its height. That is, the thickness decreases along the height of the sample/wedged lamella.

In one example, a wedged lamella may be prepared by milling a sample with an ion beam. At least a portion of the sample includes a first sample surface and a second sample surface on opposite sides (or opposite ends) of the sample. The first and second sample surfaces may be substantially parallel to each other. The first sample surface may be milled to expose a third sample surface, wherein the third surface is not parallel to the second surface. An SEM image of a fourth sample surface is acquired, and a distance of a first structure and a second structure along the height of the milled sample is estimated in the SEM image. Responsive to the estimated distance not greater than a threshold distance, sample milling may be stopped to obtain the wedged lamella. The third sample surface and the fourth sample surface may be the same sample surface or different sample surfaces.

The multiple sample slices may be removed via a glancing angle mill, wherein the ion beam is directed towards the to-be-milled sample surface at a small angle, such as less than 10 degrees, between the ion beam direction and the to-be-milled sample surface. Removing a sample slice includes scanning the ion beam along the sample's length, wherein the sample's length is orthogonal to the sample's height. In some examples, removing one sample slice may require scanning along the sample's length multiple times.

Removing the multiple sample slices may include removing a first subset of multiple sample slices from a first side of the sample, and then removing a second subset of the multiple sample slices from a second, opposite, side of the sample. During the entire process of removing the multiple sample slices, the sample position may remain the same. In some examples, the position of the electron-optical axis of the electron beam relative to the sample may remain the same during the entire process of removing the multiple sample slices to obtain the wedged lamella.

The distance between the first and second structures may be estimated in the SEM image of a sample surface after milling one or more sample slices. The electron beam may be positioned on the same side of the sample from which the sample slices are removed. Alternatively, the electron beam may be positioned on an opposite side of the sample from which the sample slices are removed. If the electron beam is positioned on the same side as the milled surface, the SEM image may include the newly milled sample surface. If the electron beam is positioned on the opposite from the milled surface, the backside of the milled sample is imaged by the SEM image. The SEM image may then include the sample surface that is modified by the milling. The locations of one or both structures in the SEM image may be modified by the milling.

Estimating the distance between the first and second structures along the height of the milled sample in the SEM image may include locating the first and second structures in the SEM image. The sample slicing/milling is stopped/terminated if the estimated distance is not greater than a threshold distance. The wedged lamella may be further processed and/or inspected by transmission electron microscopy system.

The first structure and/or the second structure may be a structure or feature within the sample. For example, first or second structure may be a component (such as a cell membrane) of a biological sample, or an edge of a transistor layer in a semiconductor sample. Alternatively, the first and second structures may be a feature created by sample processing, such as sample milling. For example, the first or second structure may be a fiducial or an edge of the milled sample.

In one example, the second structure may be the bottom edge of the milled sample. Locating the bottom edge of the milled sample may include identifying the contour of the bottom edge and estimating the location of the bottom edge based on the contour. In another example, the first structure is a transistor layer extending along the sample length. Locating the first structure may include determining the location of an upper boundary of the transistor layer along sample height (Z-axis).

The ion beam energy (or acceleration voltage) and/or the ion beam angle may be adjusted after removing one or more sample slices. The ion beam energy and/or the ion beam angle may be adjusted based on the estimated distance. For example, a lookup table may be empirically determined for a use case. The use case may be defined by one or more of sample type, sample material, and ion beam type. The lookup table includes one or more of the estimated distances, the ion beam energies and/or angles, and the threshold distances. The ion beam energy may decrease with reduced estimated distance or reduced threshold distances. The ion beam angle relative to the to-be-milled sample surface may increase with reduced estimated distance or reduced threshold distances.

Multiple threshold distances may be used for preparing the wedged lamella. For example, the threshold distance may decrease as milling progresses. After adjusting the threshold distance, the ion beam parameters, such as the beam energy and/or beam angle, may be adjusted. The adjustment of the ion beam parameters may be according to the empirically determined lookup table. Further, the milling pattern may be re-placed after adjusting the ion beam parameters.

In another example, after removing a sample slice, a second distance is predicted. The second distance is the distance between the first and second structures along the height of the milled sample after removing another sample slice. The second distance may be predicted based on the previously estimated distances between the structures along the height of the milled sample. If the second distance is not greater than the threshold distance, further milling has a high probability of over-milling the sample, therefore the sample milling may be terminated even if the estimated distance is greater than the threshold distance. In some examples, if the second distance is not greater than the threshold distance, further milling under current ion beam parameters may be terminated and the threshold distance is updated to a different (e.g. lower) level.

In some examples, the sample may be pre-prepared to expose at least one of the first and second structures before removing the multiple slices based on the estimated distance between the structures along the height of the milled sample. Sample pre-preparation may include milling one or more sample surfaces in the same or a different dual-beam system, or in another sample preparation system, to expose the structure in at least one of the surfaces.

Turning to FIG. 1, FIG. 1 is a highly schematic depiction of an embodiment of a dual-beam charged particle microscopy (CPM) system in which the present invention may be implemented; more specifically, it shows an embodiment of a FIB-SEM. System coordinates are shown as 110. Microscope 100 comprises an electron-optical column 1, which produces a beam 3 of charged particles (in this case, an electron beam) that propagates along an electron-optical axis 101. Electron-optical axis 101 may be aligned with the Z axis of the system. The column 1 is mounted on a vacuum chamber 5, which comprises a sample holder 7 and associated actuator(s) 8 for holding/positioning a sample 6. Micromanipulator 49 may be actuated by actuator 23 for manipulating a sample/specimen, such as a small specimen extracted from sample 6. The vacuum chamber 5 is evacuated using vacuum pumps (not depicted). Also depicted is a vacuum port 9, which may be opened to introduce/remove items (components, samples) to/from the interior of vacuum chamber 5. Microscope 100 may comprise a plurality of such ports 9, if desired.

The column 1 comprises an electron source 10 and an illuminator 2. This illuminator 2 comprises lenses 11 and 13 to focus the electron beam 3 onto the sample 6, and a deflection unit 15 (to perform beam steering/scanning of the beam 3). The microscope 100 further comprises a controller/computer processing apparatus 26 for controlling inter alia the deflection unit 15, lenses 11, 13, micro-manipulator 49, and detectors 19, 21, and displaying information gathered from the detectors 19, 21 on a display unit 27.

In addition to the electron column 1 described above, the microscope 100 also comprises an ion-optical column 31. This comprises an ion source 39 and an illuminator 32, and these produce/direct an ion beam 33 along an ion-optical axis 34. To facilitate easy access to the sample, the ion axis 34 is canted relative to the electron axis 101. As hereabove described, such a focused ion beam (FIB) column 31 can, for example, be used to perform processing/machining operations on the sample 6, such as incising, milling, etching, depositing, etc. The ion column 31 can also be used to produce imagery of the sample 6. It should be noted that ion column 31 may be capable of generating various different species of ion at will; accordingly, references to ion beam 33 should not necessarily been seen as specifying a particular species in that beam at any given time-in other words, the beam 33 might comprise ion species A for operation A (such as milling) and ion species B for operation B (such as implanting), where species A and B can be selected from a variety of possible options. The ion source 39 may be a liquid metal ion source or a plasma ion source.

Also illustrated is a Gas Injection System (GIS) 43, which can be used to effect localized injection of gases, such as etching or precursor gases, etc., for the purposes of performing gas-assisted etching or deposition. Such gases can be stored/buffered in a reservoir 41, and can be administered through a narrow nozzle 42, so as to emerge in the vicinity of the intersection of axes 101 and 34, for example.

The detectors 19, 21 are chosen from a variety of possible detector types that can be used to examine different types of "stimulated" radiation emanating from the sample 6 in response to irradiation by the (impinging) beam 3 and/or beam 33. Detector 19 may an X-ray detector, such as Silicon Drift Detector (SDD) or Silicon Lithium (Si(Li)) detector, for example. Detector 21 may be an electron detector in the form of a solid-state photomultiplier (SSPM) or evacuated photomultiplier tube (PMT) for example. This can be used to detect backscattered and/or secondary electrons emanating from the sample. The skilled artisan will understand that many different types of detectors can be chosen in a set-up such as that depicted, including, for example, an annular/segmented detector. By scanning the beam 3 or beam 33 over the sample 6, stimulated radiation—comprising, for example, X-rays, infrared/visible/ultraviolet light, secondary ions, secondary electrons (SEs) and/or backscattered electrons (BSEs)—emanates from the sample. Since such stimulated radiation is position-sensitive (due to said scanning motion), the information obtained from the detectors 19 and 21 will also be position-dependent.

The signals from the detectors 19 and 21 pass along control lines (buses) 25, are processed by the controller 26, and displayed on display unit 27. Such processing may include operations such as combining, integrating, subtracting, false coloring, edge enhancing, and other processing known to the skilled artisan. In addition, automated recognition processes may be included in such processing. The controller includes a non-transitory memory 29 for storing computer readable instructions and a processor 28. Methods disclosed herein may be implemented by executing the computer readable instructions in the processor. For example, the controller may control the microscope to mill and image the sample, collect data, and process the collected data for generating the 3D model of the features inside the sample. The controller may control the microscope to mill a sample mounted on a TEM grid, image the milled sample, and display the image on the display. The controller may adjust the ion beam energy by adjusting one or more lenses and/or the ion source. The controller may adjust the ion beam direction relative to the sample by adjusting either the sample orientation ad/or the optical parts in the ion column.

In some embodiments, the sample may be pre-processed in a first tool and further processed or imaged in a second tool. For example, the sample may be pre-processed in a first tool (such as a broad ion beam processing tool) and transferred to a second tool (such as a charged particle microscope) for imaging and milling. In some embodiments, instead of a FIB column, the charged particle microscope may include a broad ion beam processing tool for the milling.

Figure 2:
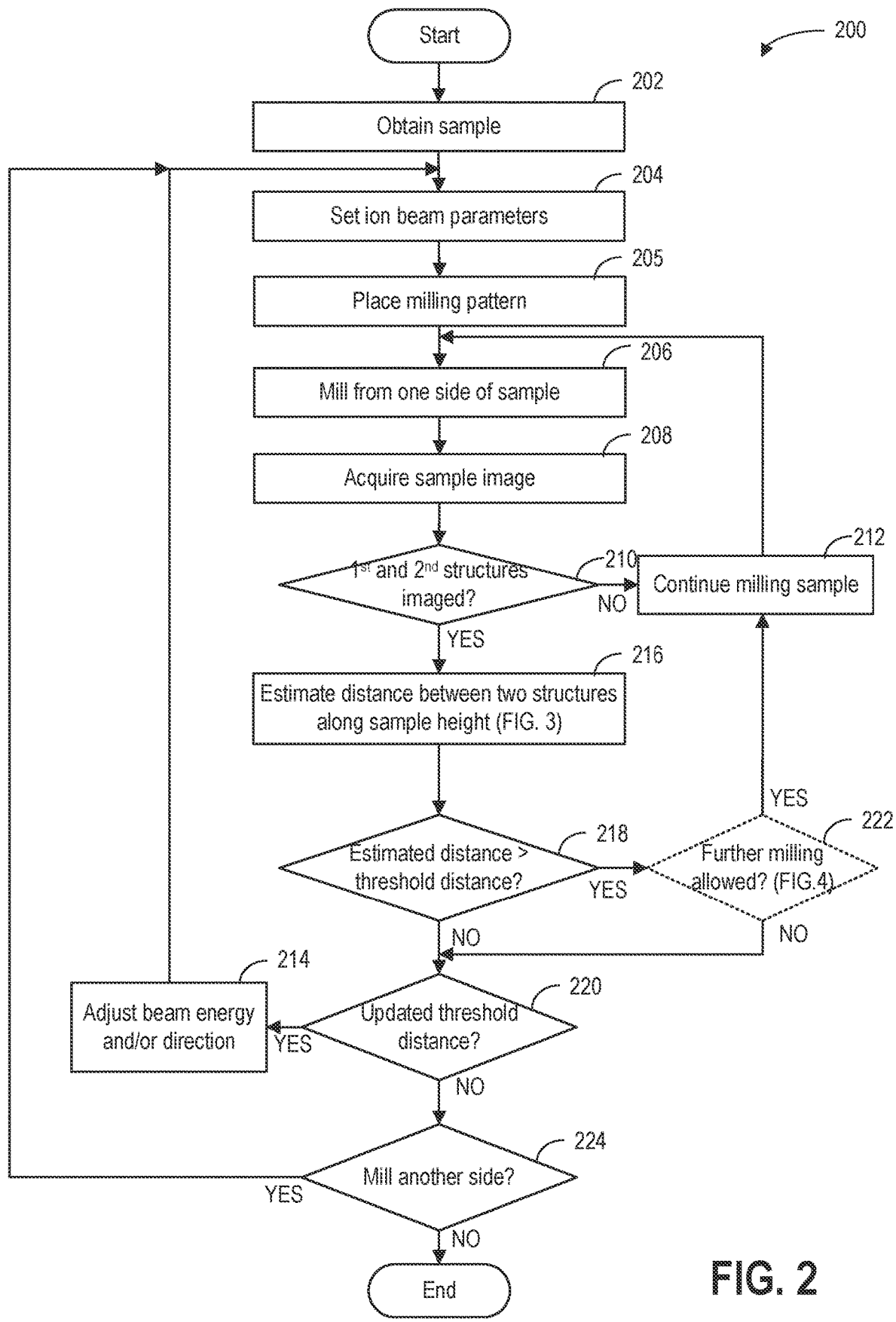
FIG. 2 is a flowchart of a method for preparing a wedged lamella.

FIG. 2 shows method 200 for preparing a wedged lamella using a charged particle microscopy system, such as the dual-beam system shown in FIG. 1. The wedged lamella is prepared by thinning/milling a sample from at least one side of the sample using an ion beam. The milling is controlled based on the SEM image of a sample surface. Specifically, the milling is monitored based on a distance between two structures along the sample's height in the SEM image. The milling may be stopped when the distance is not greater than a threshold distance.

At 202, a sample including an area of interest is obtained. The sample may have two sample surfaces on opposite sides of the sample. At least a part of the sample, or the two sample surfaces, may extend substantially in a plane defined by the length and the height of the sample. The sample thickness at the two sample surfaces may be over hundreds of nanometers. Obtaining the sample may include thinning a bulk sample, for example with an ion beam. The sample may be prepared in the dual-beam system for forming the wedged lamella, or in a different sample process system. Step 202 includes loading the sample into the CPM system.

Figure 5:
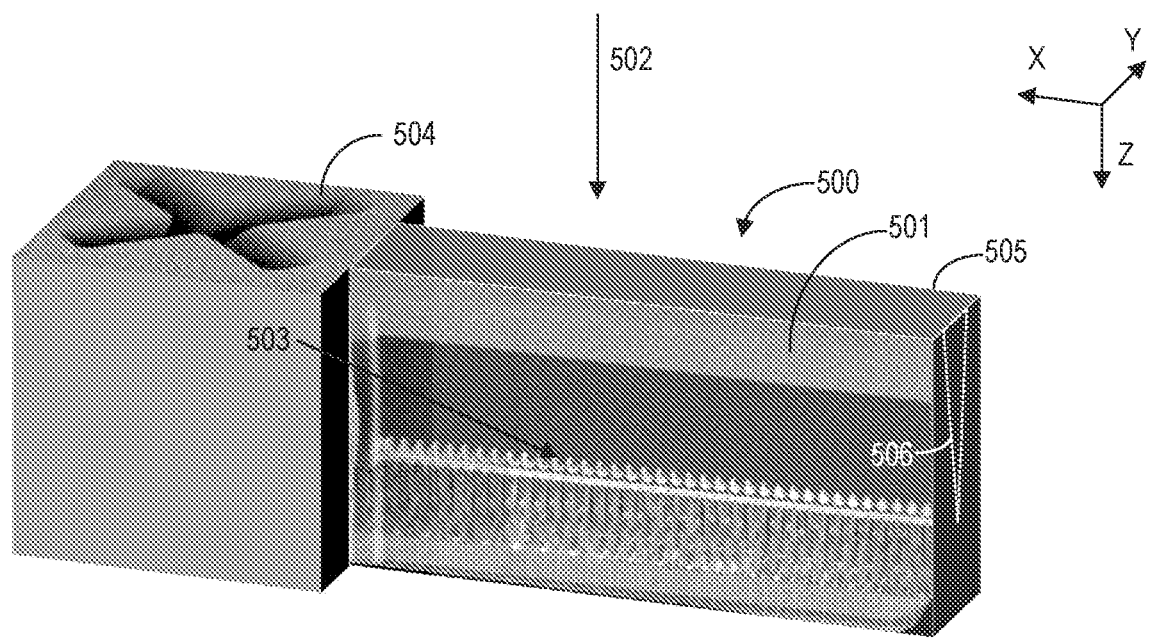
FIG. 5 illustrates a sample for preparing a wedged lamella.
Figure 6:
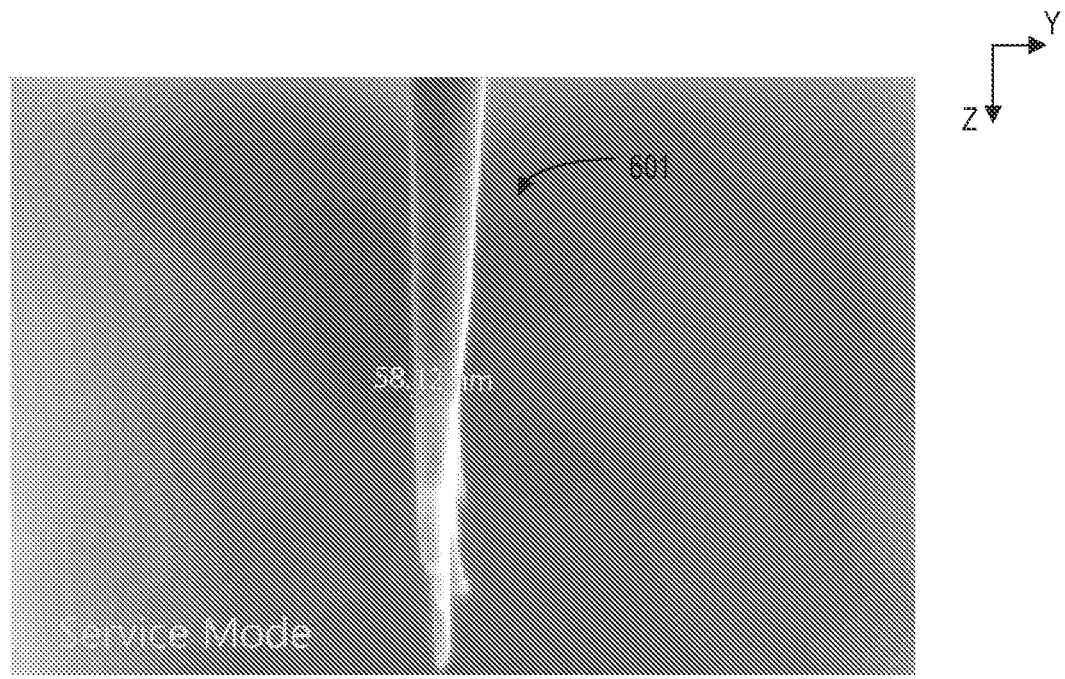
FIG. 6 is a sideview of an example wedged lamella.

FIG. 5 shows an example of a prepared semiconductor sample. It has a portion 500 extends in a plane defined by the length (X axis) and height (Z axis) of the sample coordinates. Y axis represents the sample's thickness. Two surfaces 501 and 505 are on opposite sides of the sample. Surfaces 501 and 505 may be substantially parallel to the plane defined by the X-Z axes. The sample includes a fiducial 504 on the top of the sample. Herein, top is the direction against the Z axis, and bottom is the direction along the Z axis. The goal is to prepare a wedged lamella with a side profile indicated by dashed line 506, so that the thickness at the area of interest (e.g. transistor layer 503 in FIG. 5) in the wedged lamella is at a desired range (e.g. 5-100 nm). FIG. 6 shows a side-view of a wedged lamella 601. The thickness at the area of interest is around 58 nm.

In another example, the sample may be a biological sample, and the area of interest may be a biological component in the sample.

Step 202 may include accessing information about the first and second structures of the sample. The first and second structures may be a structure or a feature within the sample. For example, the first or second structure may be a component (such as a cell membrane) of a biological sample, or an edge of a transistor layer in a semiconductor sample. Alternatively, the first or second structure may be a feature created by sample processing, such as sample milling. For example, the first or second structure may be a fiducial or an edge of the milled sample.

At 204, the ion beam parameters are set. The parameters may include one or more of the beam energy/beam voltage, the beam size, the scan speed, the dwell time and the beam direction. The parameters may include scanning/patterning parameters including one or more of scanning direction and patterning strategy. The beam energy may be empirically determined based on the sample type and the type of the ion beam. Step 204 may further include accessing stored one or more threshold distances corresponding to the use case in the memory of the system. Alternatively, system may receive the threshold distances via user input. In one example, the ion beam parameters and the corresponding threshold distances may be stored in a look-up table, and the ion beam parameters and corresponding thresholds are loaded from the look-up table.

At 205, a milling pattern is placed on one side of the sample to identify the region to be milled. Placing the milling pattern includes acquiring a FIB image of the sample and marking the milling pattern manually or automatically in the FIB image. The FIB image may be taken when the ion beam directed substantially along the Z axis of the sample, as indicated by arrow 502 in FIG. 5. The FIB image may be acquired using a back-scattered electron or secondary electron detector. The sample may then be milled/processed based on both the parameters set at 204 and the placed milling pattern.

Figure 7:
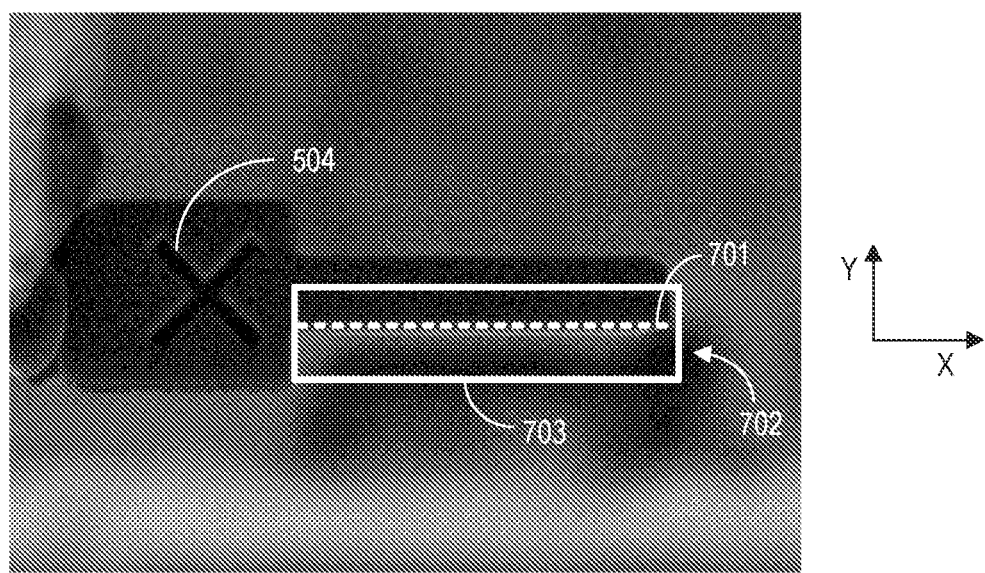
FIG. 7 illustrates placing a milling pattern.

For example, FIG. 7 is a FIB image of the top surface of the sample shown in FIG. 5. The milling pattern 702 (solid line) is marked in the FIB image based on the position of fiducial 504. The sample may be milled by scanning the ion beam along the X axis to remove a sample slice. For example, the ion beam is first scanned/moved along the bottom boundary 703 of the milling pattern. Then, the ion beam is moved a step toward the Y direction and scanned/moved along the X axis to complete another scan. One or more scans of the ion beam along the X axis at a particular Y position may remove a sample slice. Because the milling pattern 702 includes regions not having any sample material (i.e. the region between the to-be-milled sample surface 701 and bottom boundary 703), the first few scans of ion beam along the X-axis may not remove any sample material. The milling pattern is placed this way to prevent over-milling or un-desired sample material removement due to error.

At 206, the sample is milled from one side based on the parameters at 204 and the milling pattern determined at 205 to remove one or more sample slices. The ion beam is directed at a glancing angle towards the to-be-milled surface (e.g. the second surface), and scans/moves along the sample length (X-axis of the sample). A sample slice may be removed by scanning the ion beam long a line along the sample length (from one end of the milling pattern to the other end) one or multiple times.

At 208, an SEM image of a sample surface is acquired with the electron beam. The SEM image may be taken immediately after removing a sample slice, without moving the sample relative to the electron-optical axis. In one example, the angle of the electron beam from the imaged sample surface is substantially the same as the canted angle between the electron-optical axis and the ion-optical axis of the dual-beam system. As shown in FIG. 5, for SEM imaging the milled surface, the electron beam is directed towards the sample at about 52 degrees from the X-Z plane.

At 210, method 200 checks whether both the first and second structures are included in the SEM image. If the answer is NO, the sample is continuously milled at 212 according to the placed milling pattern. If both structures are included in the image acquired at 208, the distance of the structures in the milled sample is estimated at 216.

Figure 8:
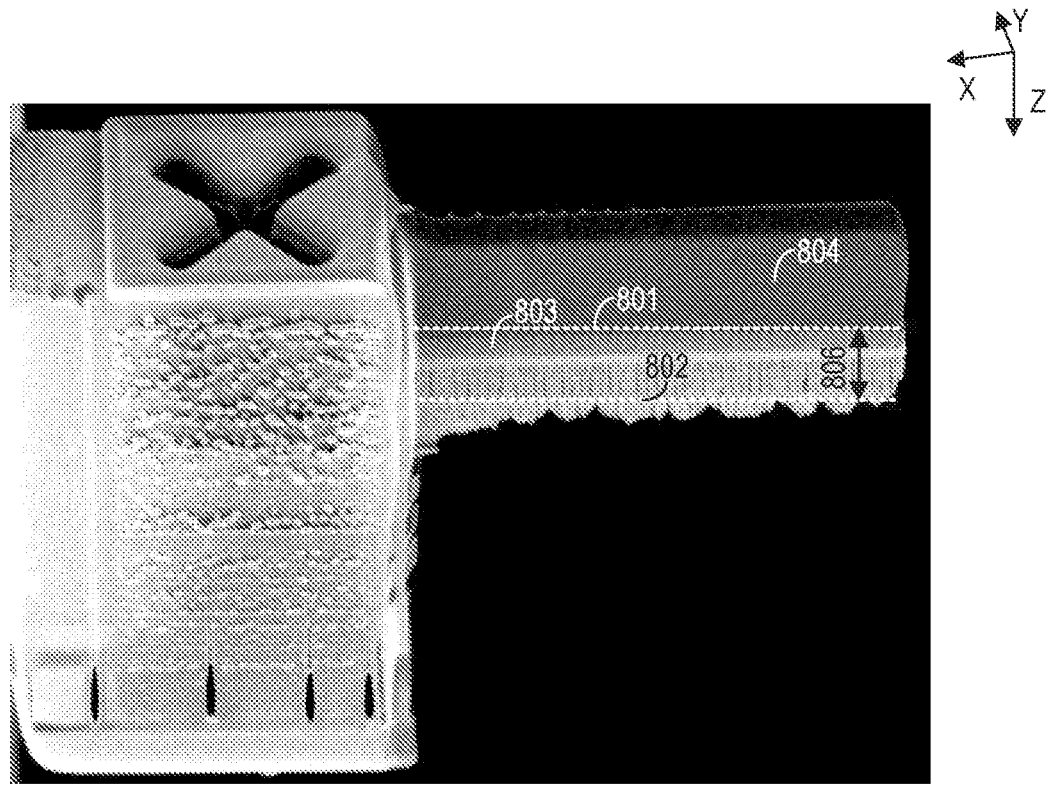
FIG. 8 and FIG. 9 show scanning electron microscopy (SEM) images of milled sample.

Step 210 may include identifying the two structures in the SEM image using an image recognition algorithm. In one example, FIG. 8 shows an SEM image after removing multiple sample slices from surface 501 of FIG. 5. The area of interest is a transistor layer 803. The first structure is the boundary 801 between the transistor layer 803 and the silicon substrate 804, and the second structure is the bottom edge of the milling sample. The first and second structures may be identified based on a change in pixel values along the sample height.

At 216, the distance between the two structures along the height of the milled sample is estimated in the SEM image acquired at 208. Method 300 in FIG. 3 details the process of estimating the distance.

At 218, the estimated distance is compared with a threshold distance, such as the threshold distance determined at 204. The threshold distance corresponds to a desired lamella thickness at the area of interest. In one example, the threshold distance may be empirically pre-determined by milling and imaging a reference sample with similar structure and composition. In another example, the threshold distance may be pre-calculated based on the ion beam properties such as the beam direction and the sputtering rate of the sample. Method 200 proceeds to 220 if the estimated distance is not greater than the threshold distance. If the estimated distance is greater than the threshold distance, method 200 proceeds to 222.

At 222, method 200 optionally checks whether further sample milling is allowed. The procedure is detailed in FIG. 4. In particular, a second distance between the two structures along the height of the milled sample after removing a further sample slice is predicted. If further milling will result in the second distance lower than the threshold distance, no further milling is allowed, and method 200 proceeds to 220. If further milling will result in the second distance not lower than the threshold distance, the sample is continued being milled with current parameters and milling pattern at 212.

At 220, method 200 checks whether the threshold distance used at 218 should be updated. Multiple threshold distances may be used sequentially for preparing the wedged lamella. The number and value of the threshold distances may be determined at 204. For example, the threshold distances may decrease over time, as the thickness of the lamella decreases. If the threshold distance is updated, method 200 proceeds to 214 to adjust the beam parameters. Otherwise, if the threshold distance is not updated, method 200 proceeds to 224.

At 214, the ion beam energy and/or the ion beam direction may be adjusted. The beam energy and/or the beam direction may be adjusted based on the estimated distance at 216 or current threshold distance used at 220, according to an empirically determined lookup table. For example, for a specific use case, the lookup table is pre-determined showing the beam energy and beam direction at various estimated distances or threshold distances. The ion beam energy may decrease with decreased estimated distance or threshold distance to avoid over-milling. The ion beam direction may be adjusted so that the milled sample tapers more towards its bottom edge. After adjusting the beam energy/direction, the sample is milled with the newly set parameters and according to a new milling pattern.

At 224, method 200 determines whether or not the other side (e.g. the opposite side to the current milling side) of the sample needs to be milled. If the answer is YES, the sample is milled on the other side according to one or more of the new ion beam parameters, new stage/sample orientation, and new milling pattern. If the answer is NO, the sample milling is terminated and a wedged lamella is obtained.

In this way, sample milling may be controlled based on the SEM image of the sample surface. The imaged sample surface may either be the milled sample surface or the un-milled surface, based on which side of the sample is milled. The SEM images throughout the preparation process can be acquired without moving the relative position between the sample and the electron-optical axis of the dual-beam system. The thickness of the milled sample is indirectly monitored based on the distance of the two structures along the height of the milled sample. This controlled milling procedure ensures that the optimal wedged lamella can be automatically and quickly produced. The wedged lamella may then be further processed and/or transferred to a TEM for inspecting the area of interest.

Figure 3:
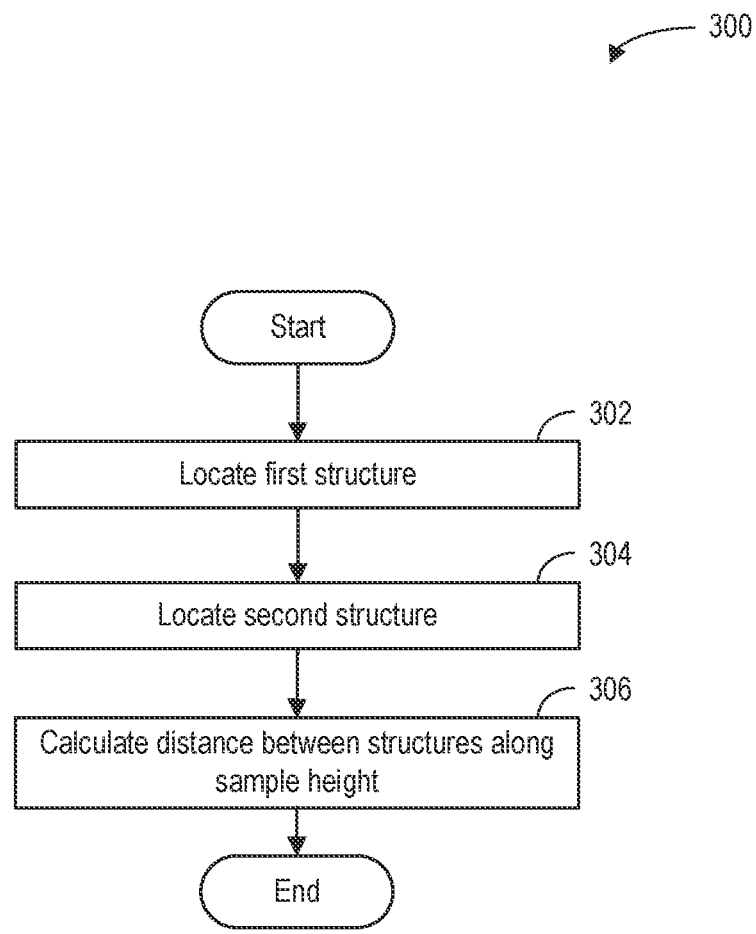
FIG. 3 is a flowchart of a method for estimating a distance between a first structure and a second structure.

FIG. 3 shows method 300 for estimating the distance of the two structures along the height of the milled sample in the SEM image.

At 302, the first structure in the SEM image is located. The first structure may be located via a feature recognition algorithm. Locating the first structure may include determining its position along the sample height (Z-axis). For example, in FIG. 8, locating the first structure may include identifying the boundary 801 between the transistor layer 803 and the silicon substrate 804. The boundary 801 may be determined based on a change in pixel values along the sample height. The first structure in the acquired image may be located using any imaging processing algorithms, such as feature extraction algorithms.

Figure 9:
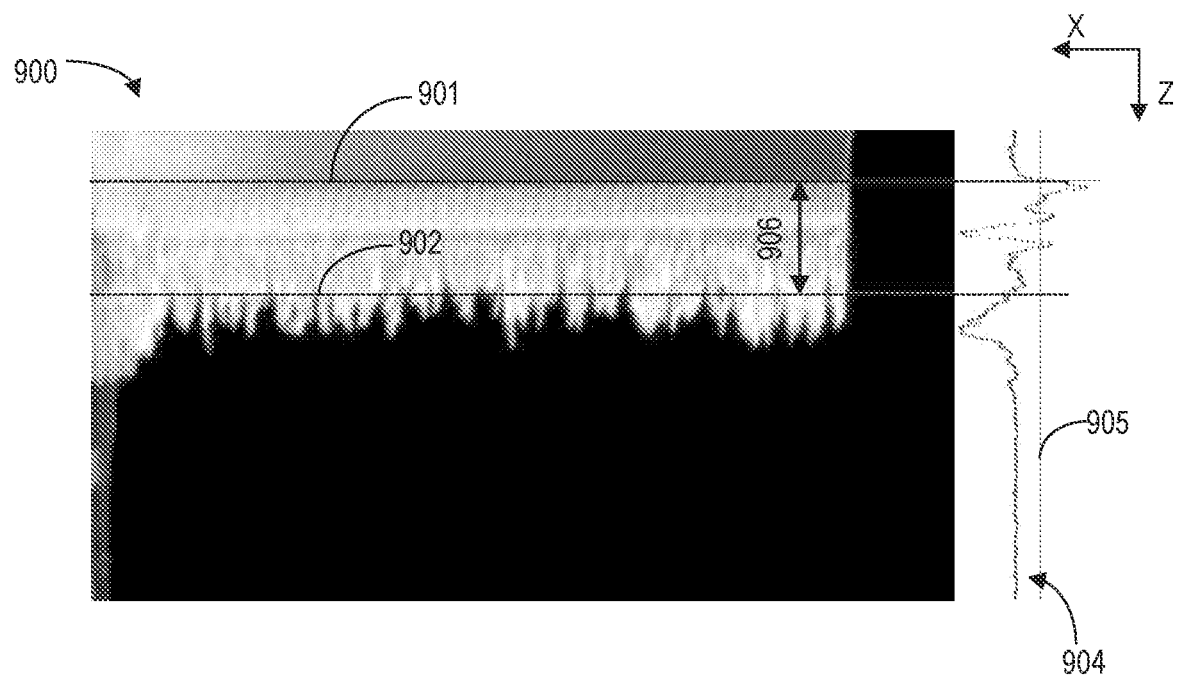

In one example, the structure's position along the sample height is determined using an accumulated pixel value along the sample length (X-axis). In FIG. 9, graph 904 is the accumulated pixel value of SEM image 900. The accumulated pixel value is an integration of pixel values in the SEM image along the sample length. The top boundary 901 between the transistor and the substrate is located where the accumulated pixel value first passes through a threshold accumulated pixel value 905 in the Z direction. In some examples, the accumulated pixel value may be calculated as the average or median of the pixel values, instead of the integration or sum of the pixel values, to generate a graph similar to graph 904.

At 304, the second structure is located. Locating the second structure may include determining its position along the sample height (Z-axis). As shown in FIG. 8, the second structure is the bottom edge of the milled sample. Due to the thin sample thickness and the unpredictable interactions between the sample's material with the ion beam, the bottom edge of the milled sample is not a straight line but a ragged contour. The position of the bottom edge on the Z-axis may be determined by an estimated bottom edge 802 parallel to the sample length (i.e. X-axis). The estimated bottom edge 802 is closest to the contour, wherein a majority (e.g. 95%) of the sample material along the estimated bottom edge 802 is not removed. The bottom edge's position on the Z-axis may equal to the estimated bottom edge's position on the Z-axis.

In one example, the bottom edge's position on the Z axis can be determined based on a percentile of high intensity pixels among the pixels at a particular sample height. As shown in FIG. 9, line 902 can be determined by calculating the percentile of pixels with values above a threshold pixel value among the pixels at a particular sample height. The bottom edge of the milled sample locates at a sample height wherein the calculated percentile first reaches a threshold percentile (such as 95%) from the bottom of the SEM image against the Z direction.

At 306, the distance between the first and second structures along the height of the milled sample is calculated. The distance may be the difference between the two structure's positions on the Z-axis determined at 302 and at 304. As an example, the estimated distance is shown as 806 in FIG. 8 and 906 in FIG. 9.

Figure 4:
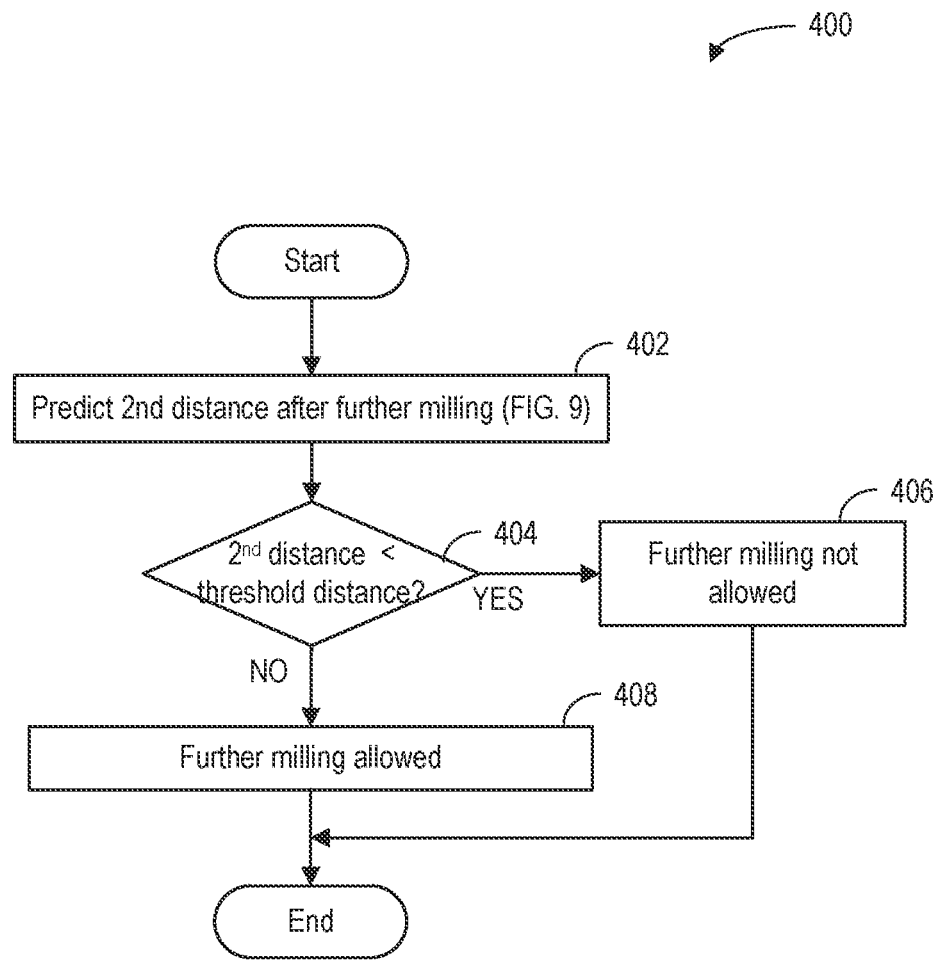
FIG. 4 is a flowchart of a method for determining whether further milling is allowed.

FIG. 4 shows method 400 for determining whether further milling is allowed. In particular, method 400 checks whether removing another sample slice with the current ion beam parameters will over-mill the sample.

At 402, a second distance between the first and second structures along the height of the milled sample is predicted. The second distance is determined based on previous estimated distances between the two structures along the sample height.

At 404, the second distance predicted at 402 is compared with the threshold distance. This threshold distance is the same as the threshold distance at 218 of FIG. 2. If the second distance is not less than the threshold distance, further milling is allowed at 408. Otherwise, if the second distance is less than the threshold distance, further milling is not allowed.

Figure 10:
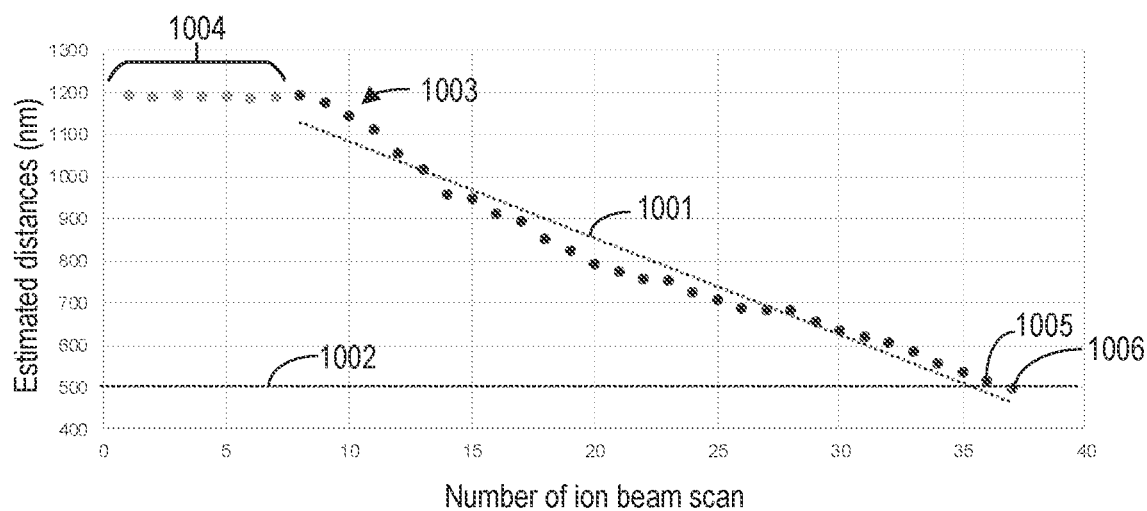
FIG. 10 illustrates predicating a second distance between the first and second structures after further milling.

For example, as shown in FIG. 10, previously estimated distances between the first and second structures of the milled sample are plotted against the number of ion beam scan. The estimated distances (estimated at 216 of FIG. 2) were recorded after placing a milling pattern. Because during the first few ion beam scans, the ion beam had not interacted with the sample, the estimated distances 1004 were relatively constant. Starting from scan number 8 or 9, materials from the sample were removed, and the estimated distance started to decrease. Line 1001 is a linear fit of the decreasing estimated distance 1003. When the $36^{th}$ ion beam scan was finished, the estimated distance 1005 was just above the threshold distance 1002. After removing the $36^{th}$ sample slice, a second distance 1006 was predicted based on the fitted line 1001. The predicted second distance 1006 was lower than the threshold distance 1002, indicating that if another sample slice was to be removed with the current ion beam parameters, the lamella thickness would be below the desired thickness. Therefore, the sample milling corresponding to the threshold distance 1002 was completed after removing the $36^{th}$ sample slice.

The technical effect of estimating the distance between a first structure and a second structure along the height of the milled sample is to indirectly monitor the thickness of wedged lamella. The technical effect of acquiring an image of the sample surface after milling is to monitor the progress of the sample thinning process. The technical effect of acquiring multiple images without moving the sample is to speed-up the sample thinning process and reduce any positioning error caused by sample movement. The technical effect of predicating the second distance is to prevent over-thinning of the sample.

Example 1 is a method for automatically preparing a wedged lamella, including: removing multiple sample slices from at least one side of a sample with an ion beam, wherein after removing at least one sample slice of the multiple sample slices, acquiring an image of a sample surface with an electron beam, and estimating a distance between a first structure and a second structure along a height of the milled sample in the acquired image, and wherein the removement of the multiple sample slices is terminated responsive to the estimated distance not greater than a threshold distance.

Example 2 includes the subject matter of any of Examples 1, and further specifies that removing multiple sample slices from at least one side of a sample includes removing a first subset of the multiple sample slices from a first side of the sample, and then removing a second subset of the multiple sample slices from a second, opposite, side of the sample.

Example 3 includes the subject matter of any of Examples 1-2, and further specifies that the threshold distance corresponds to a desired thickness of the wedged lamella at an area of interest of the sample.

Example 4 includes the subject matter of any of Examples 3, and further includes determining the threshold distance using a reference sample.

Example 5 includes the subject matter of any of Examples 1-4, and further specifies that the sample is not moved relative to an electron-optical axis of the electron beam during the removing of the multiple sample slices.

Example 6 includes the subject matter of any of Examples 1-5, and further includes adjusting a beam energy of the ion beam after removing the at least one sample slice.

Example 7 includes the subject matter of any of Examples 1-5, and further includes adjusting a beam angle of the ion beam relative to the sample after removing the at least one sample slice.

Example 8 includes the subject matter of any of Examples 1-7, and further specifies that the multiple sample slices are removed with a glancing angle mill.

Example 9 includes the subject matter of any of Examples 1-8, and further specifies that the wedged lamella tapers along the height of the milled sample.

Example 10 includes the subject matter of any of Examples 1-9, and further includes: after removing the at least one sample slice of the multiple sample slices, predicating a second distance between the first structure and the second structure along the height of the milled sample; and stopping removing the multiple sample slices responsive to the estimated distance greater than the threshold distance and the second distance not greater than the threshold distance.

Example 11 includes the subject matter of any of Examples 10, and further specifies that predicating the second distance includes predicating the second distance based on multiple previously estimated distances between the first structure and the second structure along the height of the milled sample.

Example 12 includes the subject matter of any of Examples 1-11, and further includes preparing the sample by milling the sample to expose the first structure and the second structure in the sample surface.

Example 13 is a method for automatically preparing a wedged lamella, including: providing a sample with a first sample surface and a second sample surface on opposing sides of the sample; milling the first sample surface with an ion beam to expose a third sample surface, wherein the third sample surface is not parallel to the second sample surface; acquiring an image of a fourth sample surface with an electron beam; locating a first structure and a second structure in the acquired image; estimating a distance between the first structure and the second structure along a height of the milled sample in the acquired image; responsive to the estimated distance not greater than a threshold distance, stopping further milling of the sample to obtain the wedged lamella tapering along the height of the milled sample.

Example 14 includes the subject matter of any of Examples 13, and further includes: responsive to the estimated distance greater than the threshold distance, milling the third sample surface with the ion beam to expose another sample surface.

Example 15 includes the subject matter of any of Examples 14, and further includes adjusting one or more of an ion beam energy and an ion beam angle before milling the third surface.

Example 16 includes the subject matter of any of Examples 13-15, and further specifies that milling the first surface with an ion beam includes directing the ion beam with an angle not greater than 10 degrees relative to the first surface of the sample and scanning the ion beam along a length of the sample.

Example 17 includes the subject matter of any of Examples 13-16, and further specifies that the third sample surface is the same as the fourth sample surface.

Example 18 includes the subject matter of any of Examples 13-17, and further specifies that the threshold distance is empirically determined, and the threshold distance corresponds to a desired sample thickness at an area of interest in the sample.

Example 19 is a charged particle microscopy system, including: an ion column for directing an ion beam towards a sample, wherein the sample includes a first sample surface and a second sample surface on opposite sides of the sample; an electron column for directing an electron beam towards the sample; a detector for detecting electrons emitted from the sample; and a controller including a processor and computer readable instructions stored in a non-transitory memory, wherein when the instructions are executed by the processor, the system is configured to: mill the first sample surface of the sample with the ion beam to expose a third sample surface, wherein the third sample surface is not parallel to the second sample surface; acquire an image of a fourth sample surface with the electron beam; estimate a distance between a first structure and a second structure along a height of the milled sample in the acquired image; responsive to the estimated distance not greater than a threshold distance, stop milling the sample to obtain a wedged lamella, wherein the wedged lamella tapers along the height of the milled sample; and responsive to the estimated distance greater than the threshold distance, mill the third surface with the ion beam.

Example 20 includes the subject matter of any of Examples 19, and further specifies that the second structure is a bottom edge of the milled sample.

Example 21 includes the subject matter of any of Examples 19-20, and further specifies that the third surface is the same as the fourth surface.

Example 22 includes the subject matter of any of Examples 19-20, and further specifies that the third surface is different from the fourth surface.

What is claimed is:

1. A method for automatically preparing a wedged lamella, comprising:
   removing multiple sample slices from at least one side of a sample by scanning an ion beam along a length (X-axis) of the sample to reduce a thickness (Y-axis) of the sample, wherein after removing at least one sample slice of the multiple sample slices, acquiring an image of a sample surface with an electron beam, and estimating a distance between a first structure and a second structure along a height (Z-axis) of the sample in the acquired image, and wherein the removal of the multiple sample slices is terminated responsive to the estimated distance not greater than a threshold distance, wherein the wedged lamella tapering along the height of the sample, wherein the distance between the first structure and the second structure estimated based on positions of the first structure and the second structure in the acquired image.

2. The method of claim 1, wherein removing multiple sample slices from at least one side of a sample includes removing a first subset of the multiple sample slices from a first side of the sample, and then removing a second subset of the multiple sample slices from a second, opposite, side of the sample.

3. The method of claim 1, wherein the threshold distance corresponds to a desired thickness of the wedged lamella at an area of interest of the sample.

4. The method of claim 3, further comprising determining the threshold distance using a reference sample.

5. The method of claim 1, wherein the sample is not moved relative to an electron-optical axis of the electron beam during the removing of the multiple sample slices.

6. The method of claim 1, further comprising adjusting a beam energy of the ion beam after removing the at least one sample slice.

7. The method of claim 1, further comprising adjusting a beam angle of the ion beam relative to the sample after removing the at least one sample slice.

8. The method of claim 1, wherein the second structure includes a bottom edge of the wedged lamella, and wherein a lamella thickness is reduced towards the bottom.

9. The method of claim 8, wherein the first structure includes a transistor layer extending along the length of the sample.

10. The method of claim 1, further comprising: after removing the at least one sample slice of the multiple sample slices, predicating a second distance between the first structure and the second structure along the height of the sample; and stopping removing the multiple sample slices responsive to the estimated distance greater than the threshold distance and the second distance not greater than the threshold distance.

11. The method of claim 10, wherein predicating the second distance includes predicating the second distance based on multiple previously estimated distances between the first structure and the second structure along the height of the sample.

12. The method of claim 1, further comprising preparing the sample by milling the sample to expose the first structure and the second structure in the sample surface.

13. A method for automatically preparing a wedged lamella, comprising:
providing a sample with a first sample surface and a second sample surface on opposing sides of the sample;
milling the first sample surface by scanning an ion beam along a length (X-axis) of the sample to expose a third sample surface and reduce a thickness (Y-axis) of the sample, wherein the third sample surface is not parallel to the second sample surface;
acquiring an image of a fourth sample surface with an electron beam;
locating a first structure and a second structure in the acquired image;
estimating a distance between the first structure and the second structure along a height (Z-axis) of the sample in the acquired image, wheres structure and the second structure is esti ed b positions of th d str e acquired
responsive to the estimated distance not greater than a threshold distance, stopping further milling of the sample to obtain the wedged lamella tapering along the height of the sample.

14. The method of claim 13, further comprising: responsive to the estimated distance greater than the threshold distance, milling the third sample surface with the ion beam to expose another sample surface.

15. The method of claim 14, further comprising adjusting one or more of an ion beam energy and an ion beam angle before milling the third surface.

16. The method of claim 13, wherein milling the first surface with an ion beam includes directing the ion beam with an angle not greater than 10 degrees relative to the first surface of the sample.

17. The method of claim 13, wherein the third sample surface is the same as the fourth sample surface.

18. The method of claim 13, wherein the threshold distance is empirically determined, and the threshold distance corresponds to a desired sample thickness at an area of interest in the sample.

19. A charged particle microscopy system, comprising:
an ion column for directing an ion beam towards a sample, wherein the sample includes a first sample surface and a second sample surface on opposite sides of the sample;
an electron column for directing an electron beam towards the sample;
a detector for detecting electrons emitted from the sample; and
a controller including a processor and computer readable instructions stored in a non-transitory memory, wherein when the instructions are executed by the processor, the system is configured to:
mill the first sample surface of the sample with the ion beam to expose a third sample surface and reduce a thickness (Y-axis) of the sample, wherein the third sample surface is not parallel to the second sample surface, and wherein the first sample surface is milled by directing the ion beam at a glancing angle to the first sample surface and scanning along a length (X-axis) of the sample;
acquire an image of a fourth sample surface with the electron beam;
estimate a distance between a first structure and a second structure along a height (Z-axis) of the sample in the acquired image, wherein distance between the first structure and the econd structure is estimated ba n positions of the first structure and the seconds trictire in the acquir d image;
responsive to the estimated distance not greater than a threshold distance, stop milling the sample to obtain a wedged lamella, wherein the wedged lamella tapers along the height of the sample; and
responsive to the estimated distance greater than the threshold distance, mill the third surface with the ion beam.

20. The charged particle microscopy system of claim 19, wherein the second structure is a bottom edge of the sample.

* * * * *